United States Patent
Wells et al.

(10) Patent No.: US 12,284,119 B2
(45) Date of Patent: *Apr. 22, 2025

(54) APPLICATION-BASED DATA LABELING

(71) Applicant: Cisco Technology, Inc., San Jose, CA (US)

(72) Inventors: Ian James Wells, San Jose, CA (US); Kyle Andrew Donald Mestery, Woodbury, MN (US); Carlos M. Pignataro, Cary, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/129,755

(22) Filed: Mar. 31, 2023

(65) Prior Publication Data

US 2023/0254255 A1 Aug. 10, 2023

Related U.S. Application Data

(63) Continuation of application No. 17/388,754, filed on Jul. 29, 2021, now Pat. No. 11,646,969.

(51) Int. Cl.
*H04L 47/24* (2022.01)
*H04L 45/50* (2022.01)

(52) U.S. Cl.
CPC ............ *H04L 47/24* (2013.01); *H04L 45/507* (2013.01)

(58) Field of Classification Search
CPC .............................. H04L 47/24; H04L 45/507
See application file for complete search history.

(56) References Cited

U.S. PATENT DOCUMENTS

| | | | |
|---|---|---|---|
| 10,154,123 B2* | 12/2018 | Tapia | H04L 47/122 |
| 11,071,004 B2* | 7/2021 | Gandhi | H04W 36/26 |
| 11,646,969 B2* | 5/2023 | Wells | H04L 45/507 |
| | | | 370/235 |
| 2012/0215911 A1* | 8/2012 | Raleigh | H04L 41/5019 |
| | | | 709/224 |
| 2014/0226658 A1* | 8/2014 | Kakadia | H04W 28/0273 |
| | | | 370/389 |
| 2015/0201046 A1 | 7/2015 | Biswas | |
| 2017/0346859 A1* | 11/2017 | MacFaden | G06F 9/452 |
| 2019/0303576 A1* | 10/2019 | Masputra | H04L 49/9052 |
| 2019/0306281 A1* | 10/2019 | Masputra | G06F 9/52 |
| 2023/0032924 A1 | 2/2023 | Wells et al. | |

OTHER PUBLICATIONS

Office Action for U.S. Appl. No. 17/388,754, mailed on Oct. 6, 2022, Wells, "Application-Based Data Labeling", 8 pages.

* cited by examiner

*Primary Examiner* — Chi H Pham
*Assistant Examiner* — Weibin Huang
(74) *Attorney, Agent, or Firm* — Lee & Hayes, P.C.

(57) ABSTRACT

This disclosure describes techniques for performing application-based tagging. An example method includes receiving, at a virtual socket, non-packetized data from an application and generating, by the virtual socket, a label based on the application. One or more data packets are generated by packetizing at least a portion of the non-packetized data. A header field of the one or more data packets includes a tag based on the label.

20 Claims, 6 Drawing Sheets

APPLICATION-BASED DATA LABELING

CROSS-REFERENCE TO RELATED APPLICATION

This application is a continuation of and claims priority to U.S. patent application Ser. No. 17/388,754, filed on Jul. 29, 2021, which is hereby incorporated by reference in its entirety.

TECHNICAL FIELD

The present disclosure relates generally to labeling data generated by an application prior to packetization. The labeling may enable enhanced traffic engineering, network management, and analytics.

BACKGROUND

Modern computer networks transmit data traffic between endpoint devices. An example network includes various network devices responsible for routing individual data packets through the network. As amount of data traffic increases, the network devices may apply intelligent routing to minimize the impact of network congestion on individual flows. In some cases, the network devices can prioritize certain data flows carrying latency-sensitive data packets. In some examples, the network devices may selectively drop data packets belonging to redundant and/or lower priority data flows.

To accomplish this type of prioritization within the network, the network devices may inspect the data packets in order to infer what type of data is contained in the data packets. However, traditional packet headers do not report the application from which an individual data packet originates. In general, network devices are unable to directly identify what application specifically generated the data within the data packet.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
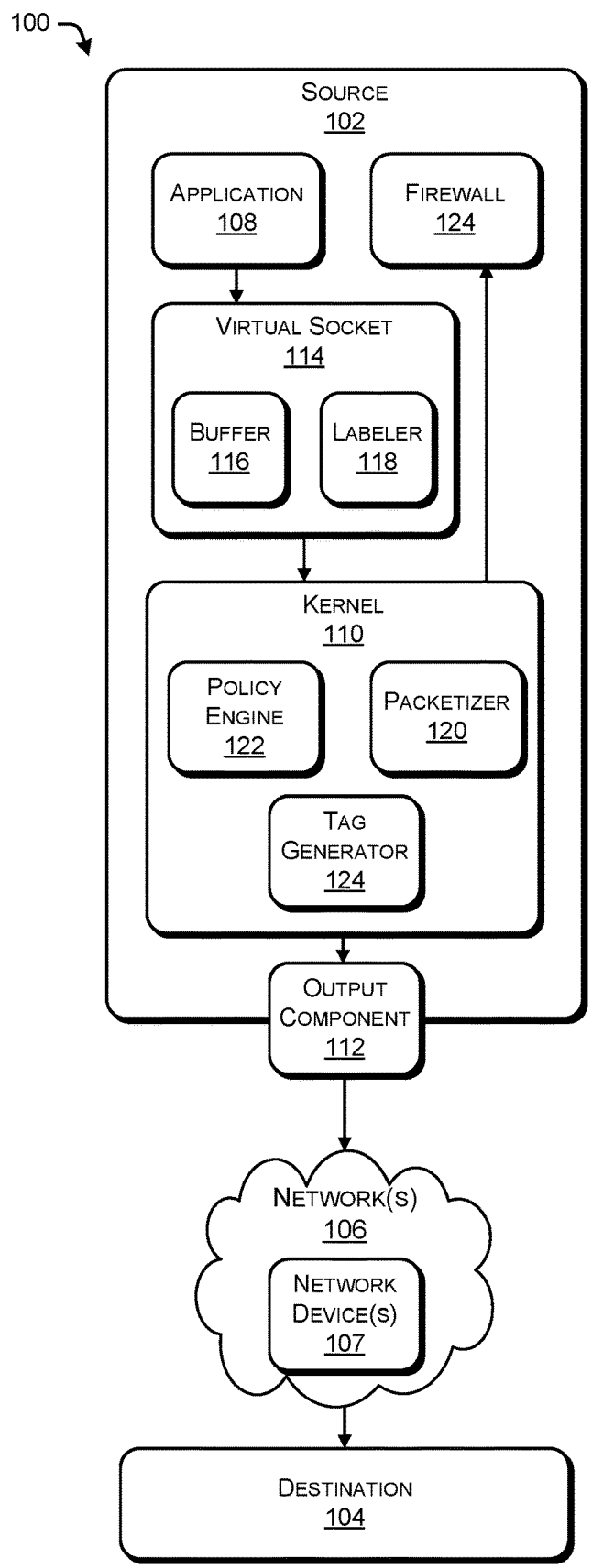
FIG. 1 illustrates an example environment for labeling data prior to packetization.

This disclosure describes various techniques for application-based labeling. An example method includes receiving, at a virtual socket of a device, non-packetized data from an application; generating, by the virtual socket of the device, a label based on the application; and providing, by the virtual socket of the device, the non-packetized data and the label to a kernel of the device. In some cases, the virtual socket includes a Berkeley Software Distribution (BSD) socket. According to some implementations the label includes one or more bits of data identifying at least one of the application, the virtual socket, or a type of the non-packetized data.

The method may further include dropping, by the kernel of the device, the non-packetized data based on the label, wherein dropping the non-packetized data includes refraining from packetizing the non-packetized data and refraining from transmitting the non-packetized data to an external device.

In some cases, the method further includes generating one or more data packets by packetizing, by the kernel of the device, the non-packetized data; and transmitting, by the device, the one or more data packets to an external device. In some instances, packetizing the non-packetized data includes: generating a tag based on the label; and adding the tag to the one or more data packets, the tag including at least one header field of the one or more data packets. In some examples, transmitting the one or more data packets includes: prioritizing, by the kernel of the device, transmission of the one or more data packets over other data packets based on the label. According to some examples, the method includes based on the label, passing, by the kernel of the device, the one or more data packets to a firewall of the device, wherein transmitting the one or more packets is based on the firewall confirming that the one or more data packets satisfy at least one security policy.

Another example method includes receiving, at a virtual socket, non-packetized data from an application; generating, by the virtual socket, a label based on the application; and generating one or more data packets by packetizing at least a portion of the non-packetized data, a header field of the one or more data packets including a tag based on the label. The virtual socket, for instance, includes a Berkeley Software Distribution (BSD) socket. In some cases, the label includes one or more bits of data identifying at least one of the application, the virtual socket, or a type of the non-packetized data.

According to some aspects, the non-packetized data is first non-packetized data, the application is a first application, the label is a first label, the external device is a first external device, and the method further includes receiving, at the virtual socket, second non-packetized data from a second application; generating, by the virtual socket, a second label based on the second application; and dropping the second non-packetized data based on the second label. In some examples, adding a tag to the one or more data packets based on the label is performed by adding the tag to at least one header field of the one or more data packets. In some examples, adding the tag to the one or more data packets based on the label includes adding the tag to at least one header field of the one or more data packets.

The method, in various implementations, further includes based on the label, analyzing, by a firewall, the one or more data packets.

In some cases, packetizing the non-packetized data includes based on the label, redundantly encoding the non-packetized data into the one or more data packets using an error correction code (ECC).

According to various implementations, any of the example methods described herein can be performed by a processor. For example, a device or system may include the processor and memory storing instructions for performing an example method, wherein the processor executes the method. In some implementations, a non-transitory computer readable medium stores instructions for performing an example method.

EXAMPLE EMBODIMENTS

This disclosure describes various techniques for labeling outgoing data from an application prior to packetization. In some cases, the labeling is performed by a virtual socket residing between the application and a kernel, wherein the virtual socket, application, and kernel are executed on the same device. A Berkeley Software Distribution (BSD) socket, which is a type of Application Programming Interface (API), is one example of a virtual socket that can be used in accordance with implementations of this disclosure. Various types of labels can be applied to the data. For example, the data can be labeled based on an identity of the application from which the data originated. In some cases, the data can be labeled based on its type. In some implementations, the data can be labeled based on an identity of the virtual socket that is performing the labeling.

In various implementations, the labeling may enable the kernel to take one or more actions about the data. For example, depending on the suspiciousness of the originating application or the type of data, the kernel may route the data to a firewall for additional analysis prior to transmission outside of the device. In some examples, the kernel relies on the labels to prioritize transmission of the data by a hardware transceiver of the device to a destination, over transmission of other types of data being transmitted by the device. In some implementations, the kernel may generate one or more tags based on the labels, generate one or more data packets including the data, and may add the tag(s) to the data packet(s) prior to transmission to an external device, such that the external device may be informed about the originating application and the type of data contained in the data packets without performing deep packet inspection or other types of analysis. In some cases, the kernel may drop the data without packetization based on the labels.

Implementations of the present disclosure solve specific problems in the field of computer networking. For example, network devices can infer the originating application of a data packet using contextual analysis of network traffic or by performing resource-intensive techniques such as deep packet inspection. In various implementations described herein, network devices may be informed of the originating application of a data packet being transmitted through a network based on accurate tags that were generated at the kernel of the originating device. Based on these accurate tags, the network devices can make various decisions about the data packets without performing an independent analysis of their contents.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for labeling data prior to packetization. The environment includes a source 102 that may transmit data externally to a destination 104 via one or more networks 106. In various implementations, the source 102 and the destination 104 may each be computing devices configured to perform network communications. Examples of the source 102 and destination 104 include, for example, at least one of a computing device, a server, a user equipment (UE), or the like. The source 102 and the destination 104 may be endpoints. As used herein, the term "endpoint," and its equivalents, may refer to a network node that represents the beginning or ending node in a data flow. As used herein, the terms "node," "network node," and their equivalents, can refer to any entity within a network that can transmit packets to and/or receive packets from at least one other node. A node may be a device, a software instance, a virtual machine (VM), a container, a virtual process, or the like. In some examples, a node may include a grouping of devices or virtual resources, such as security groups, subnetworks, and so forth. In some examples, a node can be a client, a server, or a combination thereof.

As used herein, the terms "flow," "data flow," "traffic flow," "packet flow," and their equivalents, can refer to multiple packets transmitted from a source to a destination. In some examples, a flow may include packets that share at least one of the same ingress interface (e.g., SNMP ifIndex), source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)). As used herein, the term "port," and its equivalents, can refer to a component of a node configured to connect the rest of the node to an interface. A node may have a fixed set of ports that can be selectively connected to particular interfaces. Each port of a node may have a unique identity, which may be represented by a port number. As used herein, the terms "ingress port," "entry port," and their equivalents, can refer to a port at which a packet enters a node. As used herein, the terms "egress port," "exit port," and their equivalents, can refer to a port at which a packet exits a node.

The source 102 and the destination 104 may communicate via the network(s) 106. The network(s) 106 may include one or more communication networks configured to transfer data between endpoint devices, such as the source 102 and the destination 104. The network(s) 106 may include one or more wireless networks, one or more wired networks, or a combination thereof. Examples of wireless networks include Near Field Communication (NFC) networks; Institute of Electrical and Electronics (IEEE) networks, such as WI-FI networks, BLUETOOTH networks, and ZIGBEE networks; Citizens Broadband Radio Service (CBRS) networks; $3^{rd}$ Generation Partnership Program (3GPP) networks, such as $3^{rd}$ Generation (3G), $4^{th}$ Generation (4G), and $5^{th}$ Generation (5G) Radio Access Networks (RANs); or any combination thereof. Examples of wired networks include networks connected via electrical and/or optical cables. In some cases, the network(s) 106 include at least one core network, such as an IP Multimedia Subsystem (IMS) network, an Evolved Packet Core (EPC), a 5G Core (5GC), or any combination thereof. In some implementations, the network(s) 106 include one or more Wide Area Networks (WANs), such as the Internet.

The network(s) 106 include one or more network devices 107. The network device(s) 107 may include one or more devices that are connected to each other via one or more wireless and/or wired interfaces. Examples of the network device(s) 107 include routers, network switches, access points (APs), base stations, and the like. The network device(s) 107 may include one or more network nodes.

The source 102 may include an application 108 that is configured to generate data for transmission to the destination 104. The application 108 may be a software component that is executing on one or more hardware components of the source 102. Examples of hardware components include, for example, a processor of the source 102, physical memory of the source 102, input/output (I/O) components of the source 102, and the like. Although not illustrated in FIG. 1, multiple applications including the application 108 may be executed by the source 102.

The source 102 may further include a kernel 110. As used herein, the term "kernel," and its equivalents, can refer to a portion of an Operating System (OS) responsible for facilitating interactions between software components and hardware components of a device. The kernel 110 is implemented in software operating on the source 102. In various examples, the kernel 110 allocates and/or connects computing resources of a processor of the source 102 to individual applications (e.g., the application 108) operating on the source 102. The kernel 110 may further allocate memory resources of memory of the source 102 to data from the individual applications (e.g., the application 108). The kernel 110 may connect the applications (e.g., the application 108) operating on the device to various other peripherals, such as I/O components of the source 102. The kernel 110 may also be responsible for transferring data from the applications (e.g., the application 108) to a hardware-based output component 112 (also referred to as an "output interface"), which may physically transmit the data externally from the source 102.

The output component 112, in some cases, is a hardware component of the source 102 that is configured to transmit data packets from the source 102 to the destination 104 over the network(s) 106. For example, the output component 112 may be and/or include a network interface card (NIC), a transceiver, a transmitter, a transceiver, a physical port of the source 102, or any combination thereof. Because the output component 112 is at least partially a hardware component of the source 102, the kernel 110 facilitates the transfer of data from the application 108 to the output component 112.

In various implementations, the source 102 may further include a virtual socket 114. As used herein, the term "virtual socket," and its equivalents, can refer to a software component configured to receive data from one software component and to output the data to another software component. In some examples, the virtual socket reformats the data during transfer. A virtual socket may be used for inter-process communication between different software components of a device. Examples of virtual sockets include Berkeley Software Distribution (BSD) sockets, which are also referred to as Berkeley sockets or Portable Operating System Interface (POSIX) sockets. A BSD socket is an API for communication between different software components operating on a device.

The virtual socket 114 illustrated in FIG. 1 may be used for inter-process communication between the application 108 and the kernel 110. The virtual socket 114 may receive non-packetized data from the application 108. As used herein, the term "non-packetized data," and its equivalents, can refer to data that is not packaged in discrete unit of data. For example, non-packetized data may omit headers and payloads. In some cases, non-packetized data may be in the form of a data stream. In some cases, the virtual socket 114 may at least temporarily store the non-packetized data in a buffer 116. In some implementations, the virtual socket 114 may convert the non-packetized data from one format to another format. The virtual socket 114 may output the non-packetized data to the kernel 110 for further processing.

In various implementations of the present disclosure, the virtual socket 114 may also include a labeler 118 configured to generate a label associated with the non-packetized data. The label may be used to affect treatment of the data from the application 108 further down the network stack. As used herein, the term "label," and its equivalents, can refer to one or more bits of data that indicate something about non-packetized data. In various cases, a label, however, may not be included in a header of a data packet. The labeler 118, for example, may identify the application 108 from which the non-packetized data originated, and may generate the label to identify the application 108. In some examples, the labeler 118 may generate the label to identify the virtual socket 114 itself. According to some cases, the labeler 118 may identify the type of data within the non-packetized data and may generate the label based on the type of data. In some examples, the label is associated with an individual datagram or out-of-band (OOB) message within the non-packetized data. In various implementations, the labeler 118 is implemented by a call that adds keys into a dictionary associated with the virtual socket 114. For example, the label may be a string that indicates a feature of the non-packetized data and/or the virtual socket 114.

The virtual socket 114 may provide the label to the kernel 110 with the non-packetized data. The kernel 110 may receive the non-packetized data and the label from the virtual socket 114. In various examples, the kernel 110 includes a packetizer 120 that converts the non-packetized data into one or more data packets. As used herein, the terms, "packetized data," "data packets," "packets," and their equivalents, can refer to a discrete unit of data that is packaged for transmission over a network. In some examples, the data packet(s) include one or more Transmission Control Protocol (TCP)/Internet Protocol (IP) packets. In some cases, the packetizer 120 generates a frame based on the non-packetized data, such as an Ethernet frame. The packetizer 120 may split the frame into multiple discrete data packets for transmission.

In various implementations, the kernel 110 further includes a policy engine 122 that is configured to perform one or more actions on the non-packetized data and/or data packet(s) based on the label received from the virtual socket 114. The policy engine 122 may perform the action(s) prior to and/or after the packetizer 120 generates the data packet(s). In some cases, the kernel 110 is associated with a LINUX operating system and the policy engine 122 is implemented by an extended Berkeley Packet Filter (eBPF) program. In some examples, the policy engine 122 includes an iptables, an etables, or an nftables software component for performing various functions described herein.

In some cases, the policy engine 122 may determine to encapsulate the non-packetized data and/or the data packet(s) based on the label. For example, the policy engine 122 may determine, based on the label, that application 108 from which the non-packetized data originates does not perform encryption. For instance, the non-packetized data may be in a plaintext format. Before transmission outside of the source 102, the policy engine 122 may encrypt, or cause encryption, of the non-packetized data and/or the data packet (s), such that the data packet(s) in a ciphertext format. For example, the policy engine 122 may pass the non-packetized data and/or the data packets to an encrypter operating on the source 102, which may be a software component. Alternatively, if the policy engine 122 determines, based on the label, that the application 108 does perform encryption, the policy engine 122 may refrain from encrypting the non-packetized data and/or data packet(s) prior to transmission. Accordingly, the label enables the policy engine to ensure that the data within the data packet(s) are securely encapsulated at transmission, but to also conserve computing resources by causing the source 102 to refrain from adding unnecessary levels of encryption.

In some implementations, the policy engine 122 may identify, based on the label, that the data should be further inspected by a firewall 124. For example, the kernel 110 may identify the application 108 based on the label, identify that the application 108 is configured to generate potentially sensitive data, and may refer to a security policy of the source 102 to determine that the data should be passed through the firewall 124 before it is transmitted from the source 102. In various cases, the kernel 110 passes the non-packetized data and/or data packet(s) to the firewall 124 for further analysis. The firewall 124 may be a software component operating on the source 102 that filters sensitive data in accordance with one or more security rules (also referred to as "firewall rules"). If the non-packetized data and/or the data packet(s) fails to satisfy the security rule(s), the firewall 124 may drop the non-packetized data and/or data packet(s), and thus the source 102 may refrain from transmitting the data packet(s) to the destination 104. As used herein, the term "dropping," and its equivalents, can refer to deleting or otherwise discarding data without transmission. If, on the other hand, the non-packetized data and/or the data packet(s) satisfy the security rule(s), the firewall 124 may return the non-packetized data and/or data packet(s) to the kernel 110 for external transmission to the destination 104. Thus, the kernel 110 may use the label to adaptively apply security policies based on the originating application 108 of the data.

The policy engine 122, in some cases, may drop the data based on the label. For example, if the label indicates that the application 108 is transmitting a type of data that the application 108 is not authorized to transmit, the policy engine 122 may automatically drop the non-packetized data and/or data packet(s) without transmission. Thus, the kernel 110 may use the label to prevent sensitive data from being leaked from the source 102.

In some examples, the policy engine 122 causes a tag generator 126 to generate one or more tags for the data packet(s) based on the label. As used herein, the term "tag," and its equivalents, can refer to a data field of one or more data packets that indicate something about data packets. Examples of tags include mbufs tags, which are specified as part of OpenBSD; VLAN tags, which are specified as part of IEEE 802.3; Virtual Extensible LAN (VXLAN) tags; Generic Network Virtualization Encapsulation (GENEVE) tags; Generic UDP Encapsulation (GUE) tags; bareudp tags; Multiprotocol Label Switching (MPLS) tags; and the like. The policy engine 122 may add the tag(s) to the data packet(s). The policy engine 122 may add the tag(s) to a header field of the data packet(s) or a frame in the data packet(s). For example, the policy engine 122 may add the tag(s) to a data field in the frame, such as an 802.1Q tag field, which is a 4-octet optional field that resides between the MAC address and EtherType fields of the frame.

The tag generator 126 may generate any of a variety of different tags for the frame and/or data packet(s). In some cases, the policy engine 122 may identify that the application is associated with a particular class of service for the data in the frame and/or data packet(s) being transmitted over the network(s) 106, and may cause the tag generator 126 to generate a tag indicating the class of service (e.g., a Quality of Service (QoS) level, a 5G Quality Indicator (5QI), a maximum allowed latency, or the like). In some examples, the policy engine 122 may determine that data from the identified application is not necessarily a priority for transmission, or that the application is configured to generate data redundantly for transmission, and the policy engine 122 may cause the tag generator 126 to generate a tag indicating that the frame and/or data packet(s) instructing the network device(s) 107 to drop the frame and/or data packet(s) in the event of network congestion. In general, the tag(s) may inform the network device(s) 107 about how the frame and/or data packet(s) should be treated during transmission over the network(s) 106. Thus, the kernel 110 may use the labels to notify the network device(s) about the content of the data packet(s) and/or how the data packet(s) should be treated during transmission.

According to some examples, the policy engine 122 may selectively perform a channel coding technique on the data packet(s) based on the label. For instance, the policy engine 122 may determine that the label indicates that the non-packetized data is sensitive to errors during transmission. Accordingly, the policy engine 122 may redundantly encode the non-packetized data into the data packet(s) using an error correction code (ECC). For example, the policy engine 122 may add a forward error correction (FEC) code to the data packet(s) prior to transmission.

In some implementations, the policy engine 122 may prioritize or de-prioritize the transmission of the data packet(s) by the output component 112 based on the label. In various implementations, the policy engine 122 may select the output component 112 based on the label. Although not illustrated in FIG. 1, multiple applications including the application 108 may be operating on the source 102, wherein the multiple applications may respectively be generating data to be transmitted by the output component 112. In some cases, the output component 112 may have a limited transmission throughput. For example, the output component 112 may include a buffer that temporarily stores data waiting to be transmitted by the output component 112. In some implementations, the policy engine 122 may determine that the application 108 is a latency-sensitive application and may prioritize the data packet(s) for transmission by the output component 112. For example, the policy engine 122 may cause the data packet(s) from the application 108 to be transmitted earlier than other, lower-priority data packets generated by other applications on the source 102, even when the other data packets may have been generated by the kernel 110 prior to or simultaneously with the data packet(s) from the application 108. Alternately, if the kernel 110 determines that the data packet(s) from the application 108 are latency insensitive, the kernel 110 may cause the output component 112 to prioritize the transmission of other, more latency-sensitive data packets over transmission of the data packet(s) from the application 108. In some instances, the output component 112 may have a prioritized queue for transmission and a non-prioritized queue for transmission, and the kernel 110 may selectively cause the data packet(s) to be added to the prioritized queue or the non-prioritized queue based on the label. As a result, the kernel 110 may use labels to reduce the transmission latency of latency-sensitive data.

According to some cases, the output component 112 may include multiple ports. The policy engine 122 may select one or more of the ports for transmission of the data packet(s) based on the label. For example, the policy engine 122 may select a prioritized port, or a relatively uncongested port, if the policy engine 122 determines that the label indicates that the data packet(s) carry prioritized data. Alternatively, the policy engine 122 may select a non-prioritized port, or a relatively congested port, if the policy engine 122 determines that the label indicates that the data packet(s) carry non-prioritized data. Thus, the kernel 110 may use labels to prioritize port selection for transmission.

According to some cases, the policy engine 122 may utilize the label to perform analytics. For example, the policy engine 122 may store analytics data indicating how much data is associated with a particular label, such as a number of bytes or data streams being generated from the application 108 and/or being transferred through the virtual socket 114. The policy engine 122 may store analytics data indicating respective amounts of data associated with different labels received by the policy engine 122. In some cases, the policy engine 122 may add analytics data to the tag of the data packet(s), or otherwise attach the analytics data to the data packet(s). For example, the analytics data may be used by the network device(s) 107 for OpenTracing. OpenTracing, in various examples, is an instrumentation code injected into the actual application and can be used distributed tracing, performance measurement, and so on. The analytics data can be used by the network device(s) 107 to augment the visibility of the application 108.

The output component 112 may transmit the data packet(s) to the destination 104 via the network device(s) 107 in the network(s) 106. For example, the network device(s) 107 may receive the data packet(s) from the source 102 and transmit the data packet(s) to the destination 104 along a network path. As used herein, the terms "path," "network path," and their equivalents, can refer to a specific sequence of nodes and/or interfaces over which a packet traverses. In various examples, the network device(s) 107 may route the data packet(s) based on the tag(s). For instance, the network device(s) 107 may route the data packet(s) along a prioritized path through the network(s) 106 upon determining that the tag(s) indicate that the data packet(s) are associated with a heightened class of service. In some cases, the network device(s) 107 may drop the data packet(s) upon determining that a congestion level of the network(s) 106 exceeds a threshold and determining that the tag(s) indicate that the data packet(s) are eligible to be dropped. In various implementations, the network device(s) 107 may transmit the data packet(s) to the destination 104.

Specific examples will now be described with reference to FIG. 1, however, implementations of the present disclosure are not limited to the specific examples described.

In some examples, the application 108 generates ultra-reliable low latency communication (URLLC), non-packetized data. In some cases, the application 108 only generates URLLC data. For example, the application 108 may be a remote surgery application configured to generate remote surgery data to be transmitted to an external device (e.g., a surgical robot or surgeon-operated computing device). The virtual socket 114 may generate a label for non-packetized data generated by the application 108 that indicates the non-packetized data originates from the application 108 and/or that the non-packetized data includes URLLC data.

The kernel 110 may generate data packets including the URLLC data and the policy engine 122 take any of various actions to minimize latency and/or packet loss based on the label. For example, the policy engine 122 may provide the data packets to a prioritized port and/or queue of the output component 112 for transmission to the external device. In some cases, the policy engine 122 may generate a tag indicating that the data packets carry URLLC data, that the data packets should be transmitted through a prioritized path in the network 106 (e.g., a dedicated bearer, a 5QI tunnel, an NR interface, etc.), that the data packets are associated with a URLLC class-of-service, or the like. Accordingly, the label may enable the kernel 110 to implement URLLC services for the application 108.

In some cases, the application 108 handles sensitive data. For instance, the application 108 may be a banking application that handles confidential banking information of a user. The virtual socket 114 may generate a label for non-packetized data generated by the application 108, indicating that the non-packetized data originates from the application 108. The policy engine 122 may recognize that the non-packetized data may include sensitive data based on the label indicating that the non-packetized data originates from the application 108. Accordingly, the policy engine 122 may pass the non-packetized data to the firewall 124 for further analysis. The firewall 124 may apply a security rule, such as a rule indicating that any data from the application 108 should only be sent to one or more predetermined destinations. Upon confirming that the non-packetized data is addressed to a predetermined destination, the firewall 124 may signal to the kernel 110 that the non-packetized data is ready for transmission. Based on the label, the policy engine 122 may further add a layer of encryption onto the non-packetized data to enhance security. The policy engine 122 may generate data packets by packetizing the non-packetized data and transmit the data to the destination 104.

Figure 2:
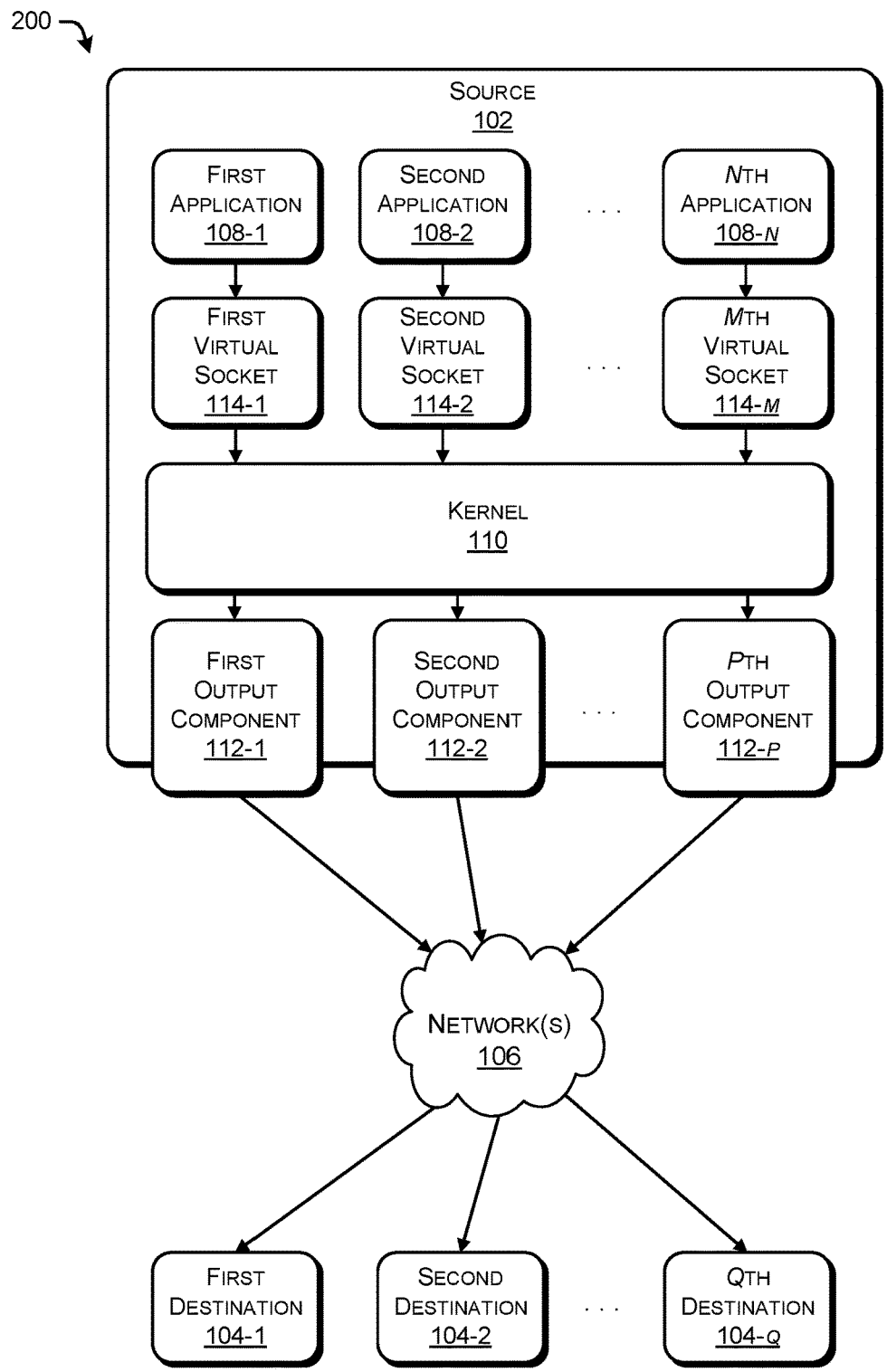
FIG. 2 illustrates an alternate environment that includes a source described with reference to FIG. 1.

FIG. 2 illustrates an alternate environment 200 that includes the source 102 described above with reference to FIG. 1. As shown, the source 102 may include first through nth applications 108-1 to 108-n, wherein n is a positive integer. The first through nth applications 108-1 to 108-n may include a variety of different types of applications, which may be configured to generate different types of data for transmission over the network(s) 106. In some examples, the first application 108-1 may be configured to generate latency-sensitive data and the second application 108-2 may be configured to generate latency-insensitive data. In some cases, the first application 108-1 may be configured to generate sensitive data and the second application 108-2 may be configured to generate non-sensitive data.

The first to nth applications 108-1 to 108-n may be connected to the kernel 110 by first through mth virtual sockets 114-1 to 114-m, wherein m is a positive integer. In some cases, n is different than m. For example, multiple virtual sockets among the first through mth virtual sockets 114-1 to 114-m may connect a single one of the first to nth applications 108-1 to 108-n to the kernel 110, or a single virtual socket among the first to mth virtual sockets 114-1 to 114-m may connect multiple applications among the first to nth applications 108-1 to 108-n to the kernel 110. The first to mth virtual sockets 114-1 to 114-m may be configured to generate labels for non-packetized data from the first to nth applications 108-1 to 108-n. The labels may identify the application from which the non-packetized data originated, a type of the non-packetized data, the virtual socket generating the label, or any combination thereof. In cases where a single application among the applications 108-1 to 108-n is connected to a single virtual socket among the first to mth virtual sockets 114-1 to 114-*m*, a label indicating the virtual socket generating the label may further indicate the originating application, or vice versa.

The kernel 110 may receive the non-packetized data and the labels from the first to mth virtual sockets 114-1 to 114-*m*. The kernel 110 may be configured to generate data packets by packetizing the non-packetized data. In various implementations, the kernel 110 may take actions on the non-packetized data and/or data packets based on the labels. In some cases, the kernel 110 may selectively forward non-packetized data and/or one or more data packets to a firewall based on their corresponding label. In some examples, the kernel 110 may selectively drop the non-packetized data and/or data packet(s) based on their corresponding label. In some implementations, the kernel 110 may generate a tag based on a label and add the tag to the corresponding data packet(s) prior to transmission.

In some cases, the kernel 110 may prioritize transmission of the data packets based on the corresponding labels. As shown in FIG. 2, the source 102 may include first to pth output components 112-1 to 112-*p*, wherein p is a positive integer. In some implementations, the kernel 110 may select one of the first to pth output components 112-1 to 112-*p* for transmitting data packet(s) from a particular application among the first to nth applications 108-1 to 108-*n* based on the corresponding label. For instance, the first output component 112-1 may be configured to have a higher transmission throughput than the second output component 112-2. For example, the first output component 112-1 may include a New Radio (NR) transceiver and the second output component 112-2 may include a Long Term Evolution (LTE) transceiver. The kernel 110 may receive non-packetized data from the first virtual socket 114-1 along with a label that indicates the non-packetized data is from the latency-sensitive first application 108-1. The kernel 110 may generate one or more data packets by packetizing the non-packetized data. To reduce transmission latency for the data packet(s), the kernel 110 may select the first output component 112-1, rather than the second output component 112-2, and cause the data packet(s) to be transmitted over the network(s) 106 via the first output component 112-1. In a contrasting example, the kernel 110 may receive non-packetized data from the second virtual socket 114-2 along with a label indicating that the non-packetized data is from the latency-insensitive second application 108-2. The kernel 110 may generate one or more data packets by packetizing the non-packetized data, and select the second output component 112-2 for transmission of the data packet(s) from the latency-insensitive second application 108-2, rather than expending resources of the first output component 112-1.

The environment 200 of FIG. 2 also includes first to qth destinations 104-1 to 104-*q*, wherein q is a positive integer. In various implementations, an individual application among the first to nth applications 108-1 to 108-*n* may generate data that is directed to one or more of the first to qth destinations 104-1 to 104-*q*. For example, the data packet(s) generated by the kernel 110 based on non-packetized data generated by the first application 108-1 may be transmitted to the first destination 104-1, or both the first destination 104-1 and the second destination 104-2. In some cases, different applications among the first to nth applications may generate data that is directed to different destinations among the first to qth destinations 104-1 to 104-*q*. For instance, the data packet(s) generated by the kernel 110 based on non-packetized data generated by the first application 108-1 may be transmitted to the first destination 104-1, and the data packet(s) generated by the kernel 110 based on non-packetized data generated by the second application 108-1 may be transmitted to the second destination 104-2.

Figure 3:
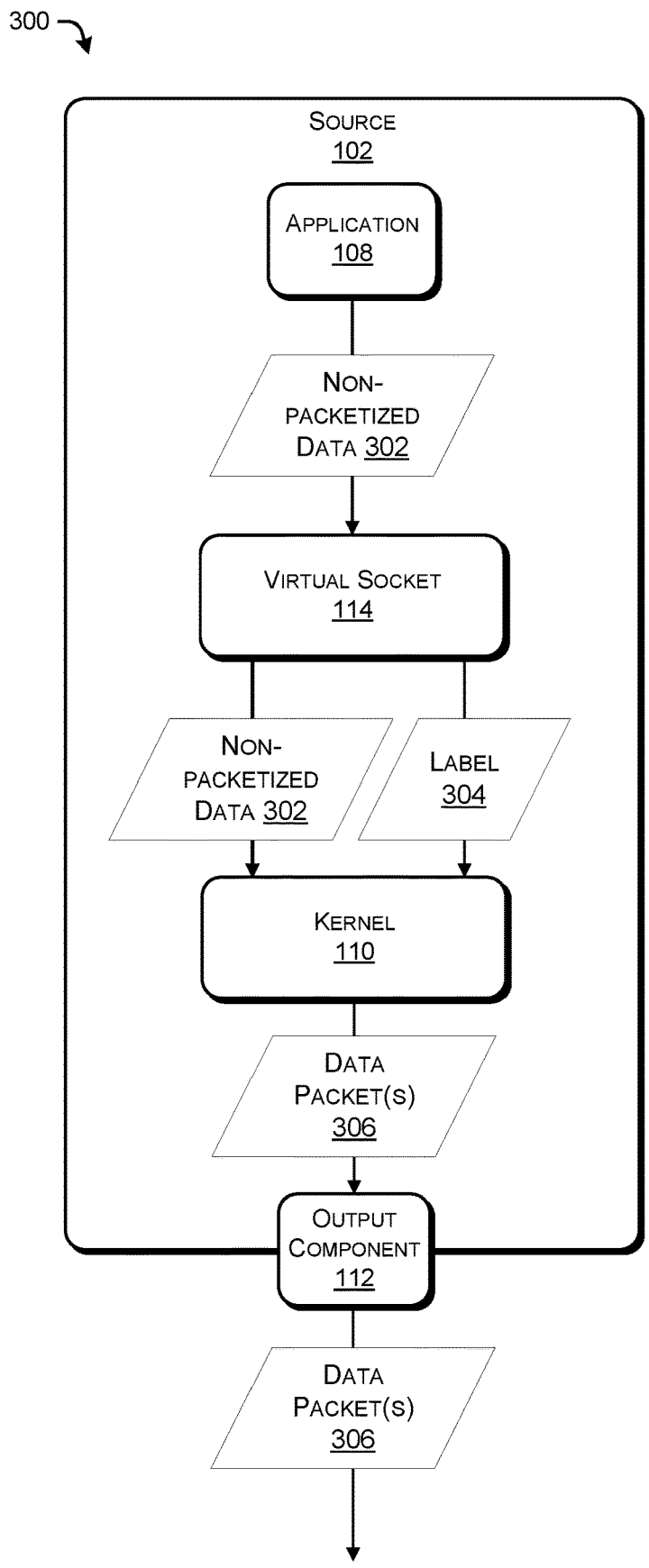
FIG. 3 illustrates example signaling associated with the source described with reference to FIG. 1.

FIG. 3 illustrates example signaling 300 associated with the source 102 described above with reference to FIG. 1. As shown, the application 108 generates non-packetized data 302 and provides the non-packetized data 302 to the virtual socket 114.

The virtual socket 114 generates a label 304 based on the non-packetized data 302. In some implementations, the label 304 may indicate the application 108 that generated the non-packetized data 302. For example, the application 108 may be associated with an identifier (e.g., a unique string or number that is associated with the application 108) and the label 304 may include the identifier. In some cases, the label 304 may indicate the virtual socket 114 itself. For example, the virtual socket 114 may be associated with an identifier (e.g., a unique string or number that is associated with the application 108) and the label 304 may include the identifier. In some cases, the label 304 indicates a type of data within the non-packetized data 302. For instance, the label 304 may indicate that the non-packetized data 302 includes user plane data, control plane data, a class of service of the data (e.g., a 5QI of the data), a type of application data (e.g., voice over IP (VOIP), HTTP, HTTPS, etc.) within the non-packetized data 302, whether the data is latency sensitive, whether the data is encrypted, whether the data includes sensitive data, or any combination thereof.

The virtual socket 114 provides the non-packetized data 302 with the label 304 to the kernel 110. In some cases, the virtual socket 114 at least temporarily buffers the non-packetized data 302 before providing the non-packetized data to the kernel 110. According to some implementations, the label 304 corresponds to a single message (e.g., datagram) within the non-packetized data 302.

In various implementations, the kernel 110 generates one or more data packets 306 based on the non-packetized data 302. According to some examples, the kernel 110 may encrypt the non-packetized data 302 prior to packetization. In various cases, the kernel 110 may generate the data packet(s) 306 by packetizing the non-packetized data 302.

Further, the kernel 110 may perform one or more actions on the non-packetized data 302 and/or the data packet(s) 306 based on the label 304. In some examples, the kernel 110 may add a tag to the data packet(s) 306 based on the label 304. The tag, for example, may be included in a header field of the data packet(s) 306. The tag may be used, by a network device receiving the data packet(s) 306, to perform routing decisions for the data packet(s) 306 through a communication network. In some cases, the kernel 110 may add an encapsulation to the data packet(s) 306 based on the label 304. In some examples, the kernel 110 may select a port or output component 112 queue for the data packet(s) 306 based on the label 304. According to some implementations, the kernel 110 may run the data packet(s) 306 through a particular service chain based on the label 304. In some cases, the kernel 110 may add an error correction code (e.g., a forward error correction (FEC) code) to the data packet(s) 306 based on the label 304. In some examples, the kernel 110 may selectively encrypt the data packet(s) 306 based on the label 304. According to some cases, the kernel 110 may generate and/or store analytics data about the application 108, the virtual socket 114, the non-packetized data 302, the data packet(s) 306, or any combination thereof, based on the label 304.

The kernel 110 may provide the data packet(s) 306 to the output component 112. The output component 112, in turn, may transmit the data packet(s) 306 to a destination external to the source 102. According to some implementations, the output component 112 may transmit the data packet(s) 306 over a network that includes network devices. A network device, for example, may receive the data packet(s) 306 and take an action based on a tag within the data packet(s) 306. For example, the network device may selectively drop the data packet(s) 306 based on the tag (e.g., in the presence of network congestion). In some cases, the network device may route the data packet(s) 306 along a path through the network based on the tag. For example, the network device may select an egress port of the network device from which to transmit the data packet(s) 306 based on the tag.

Figure 4:
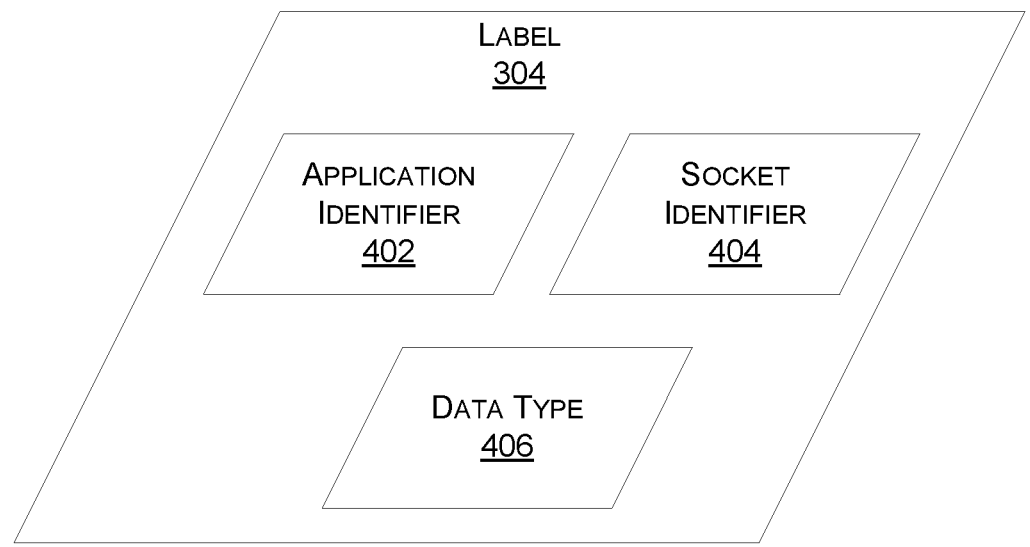
FIG. 4 illustrates an example of a label.

FIG. 4 illustrates an example of the label 304. The label 304 may include an application identifier 402, a socket identifier 404, and a data type 406. In some examples, the label 304 may omit the application identifier 402, the socket identifier 404, the data type 406, or any combination thereof. The label 304 may include one or more bits of data representing the application identifier 402, the socket identifier 404, and the data type 406. In various implementations, the label 304 may be generated based on non-packetized data from an originating application operating on a source.

The application identifier 402 includes a unique identifier for the originating application that has generated the non-packetized data. In some examples, multiple applications are operating on the source. The source may assign different identifiers to the applications, such that no two applications have the same identifier. Identifiers can be represented by one or more bits, one or more numbers, one or more letters, one or more symbols, or a combination thereof. The application identifier 402 may specifically include the identifier associated with the application that has generated the non-packetized data.

The socket identifier 404 includes a unique identifier for the virtual socket generating the label 304. In some implementations, multiple virtual sockets are operating on the source. The source may assign different identifiers to the virtual sockets, such that no two virtual sockets have the same identifier. The identifiers can be represented by one or more numbers, one or more letters, one or more symbols, or a combination thereof. The socket identifier 404 may include the identifier associated with the virtual socket that has generated the label 304.

The data type 406 identifies a type of the non-packetized data. In various cases, the data type 406 may indicate whether the non-packetized data includes user plane data, control plane data, a class of service of the data (e.g., QoS level and/or a 5QI of the data), whether the data is latency sensitive, whether the data is encrypted, whether the data includes sensitive data, or any combination thereof. In some examples, the originating application may generate different types of data, and the data type 406 may indicate what type of data is contained in the instance of non-packetized data being labeled.

Figure 5:
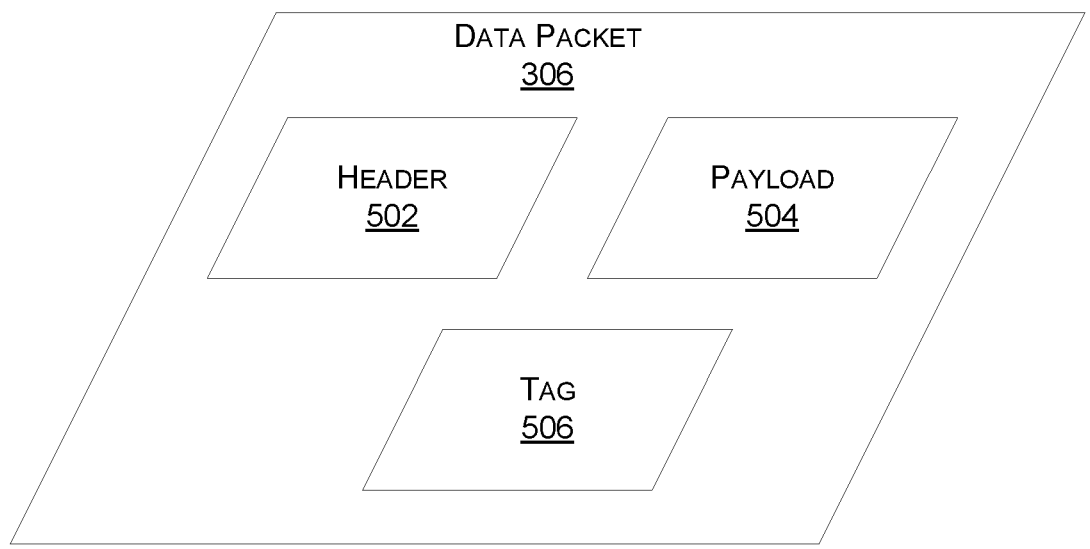
FIG. 5 illustrates an example of a data packet.

FIG. 5 illustrates an example of a data packet 306. As shown, the data packet 306 includes a header 502, a payload 504, and a tag 506. In various implementations, the data packet 306 omits the label 304 described above with reference to FIGS. 3 and 4.

The header 502 may include control information that enables network devices to route the data packet 306 to its destination. In some cases, the header 502 includes an address of the source of the data packet 306 and/or an address of the destination of the data packet 306. Examples of addresses include IP addresses and MAC addresses. In various examples, the header 502 may indicate the length of the data packet 306. In some cases, the header 502 includes error detection and/or correction information to be used during transmission, such as a checksum, parity bits, or an error-detecting code (e.g., a cyclic redundancy check (CRC)). According to some examples, the header 502 may include a transmission priority associated with the data packet 306, such as a class of service and/or QoS associated with the data packet 306. In some cases, the header 502 includes a hopcount, hop limit, or time-to-live field that can be used to prevent network devices from transmitting the data packet 306 in an indefinite routing loop within the network.

The payload 504 may include substantive user data carried by the data packet 306. In some examples, the payload 504 includes at least a portion of non-packetized data originally generated by an application operating on the source of the data packet 306.

The tag 506 may provide additional details about the data in the payload 504 to a network device. In some cases, the tag 506 is part of the header 502 or the payload 504. For example, the tag 506 may be and/or include the priority field of the header 502. In various implementations, the network device can take one or more actions based on the tag 506. For example, the tag 506 may indicate that the data packet 306 should be dropped in the presence of network congestion. If the network device is congested and receives the data packet 306, the network device may drop the data packet 306 based on the tag 506. In some instances, the tag 506 may indicate a class of service of the data packet 306. The network device may select a routing path for the data packet 306 through the network based on the class of service. For instance, if the tag 506 indicates that the data packet 306 includes URLLC data, then the network device may route the tag 506 along a prioritized routing path through the network to fulfill the low-latency requirements of the URLLC data.

Figure 6:
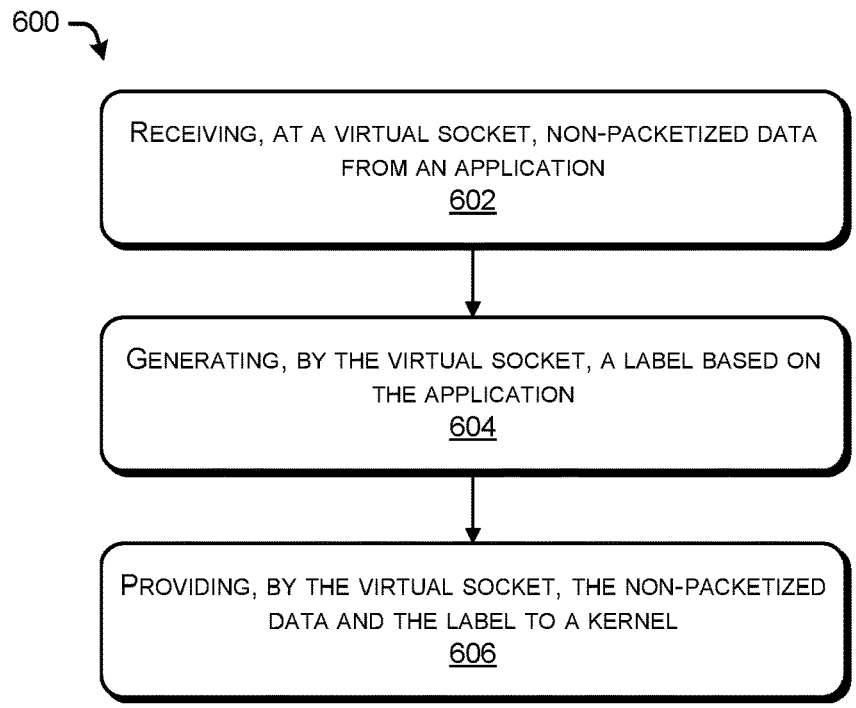
FIG. 6 illustrates an example process for labeling data prior to packetization.

FIG. 6 illustrates an example process 600 for labeling data prior to packetization. The process 600 may be performed by an entity, such as one or more of the source 102, the virtual socket 114, or any of the virtual sockets 114-1 to 114-m described above with reference to FIGS. 1 and 2.

At 602, the entity receives, at a virtual socket, non-packetized data from an application. The non-packetized data may include a stream of data from the application. In some implementations, the virtual socket may at least temporarily buffer the non-packetized data. In various cases, the non-packetized data omits data packets. For example, the data is received by the virtual socket prior to packetization for transmission to an external device. The virtual socket is a BSD socket connecting the application to a kernel, in various implementations.

At 604, the entity generates, by the virtual socket, a label based on the application. The label may identify the application and/or the virtual socket. For example, the label may include an identifier of the application. In some instances, the label may include an identifier of the virtual socket. According to some cases, the label may indicate a type of data in the non-packetized data. The label may include a string and/or number.

At 606, the entity provides, by the virtual socket, the non-packetized data and the label to a kernel. In various implementations, the entity provides the non-packetized data and the label to the kernel in parallel. In some cases, the entity provides the label to the kernel prior to providing the non-packetized data to the kernel, as the entity is providing the non-packetized data to the kernel, or after the entity has provided the non-packetized data to the kernel. In some cases, the entity provides the non-packetized data and the label to an eBPF of the kernel. The kernel and/or the eBPF may perform one or more actions on the non-packetized data based on the label.

Figure 7:
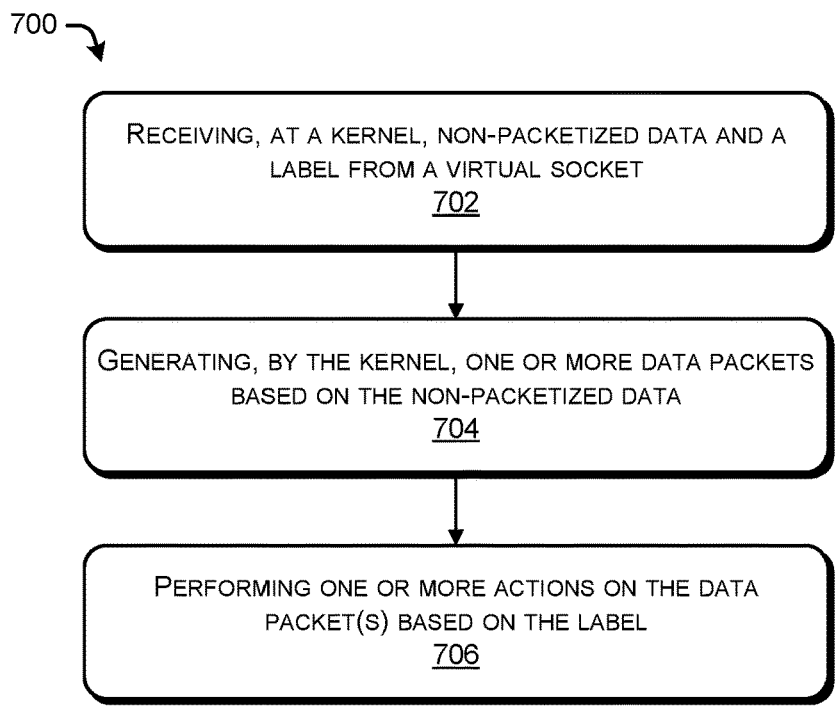
FIG. 7 illustrates an example process for using a label associated with non-packetized data.

FIG. 7 illustrates an example process 700 for using a label associated with non-packetized data. The process 700 may be performed by an entity, such as the source 102 and/or the kernel 110 described above with reference to FIG. 1. In some cases, the entity includes an eBPF.

At 702, the entity receives, at a kernel, non-packetized data and a label from a virtual socket. In various implementations, the non-packetized data is provided to the kernel by the virtual socket from an application. The non-packetized data may include a stream of data from the application. In some implementations, the virtual socket may at least temporarily buffer the non-packetized data. In various cases, the non-packetized data omits data packets. For example, the data is received by the virtual socket prior to packetization for transmission to an external device. The virtual socket is a BSD socket connecting the application to a kernel, in various implementations.

The label may indicate information about the non-packetized data. The label may identify the application and/or the virtual socket. For example, the label may include an identifier of the application. In some instances, the label may include an identifier of the virtual socket. According to some cases, the label may indicate a type of data in the non-packetized data. The label may include a string and/or number.

At 704, the entity generates, by the kernel, one or more data packets based on the non-packetized data. For example, the entity may packetize the non-packetized data. The data packet(s), for example, may be IP packets.

At 706, the entity performs one or more actions on the data packet(s) based on the label. In some examples, the entity may add a tag to the data packet(s) based on the label 304. The tag, for example, may be included in a header field of the data packet(s). The tag may be used, by a network device receiving the data packet(s), to perform routing decisions for the data packet(s) through a communication network. In some cases, the entity may add an encapsulation to the data packet(s) based on the label. In some examples, the entity may select a port or output component queue for the data packet(s) based on the label. According to some implementations, the entity may run the data packet(s) through a particular service chain based on the label. In some cases, the entity may add an error correction code (e.g., an FEC) to the data packet(s) based on the label. In some examples, the entity may selectively encrypt the data packet(s) based on the label. According to some cases, the entity may generate and/or store analytics data about the application, the virtual socket, the non-packetized data, the data packet(s), or any combination thereof, based on the label. In some implementations, the entity may drop the data packet(s) based on the label. In some cases, the entity may cause an output component to transmit the data packet(s) to an external device.

Figure 8:
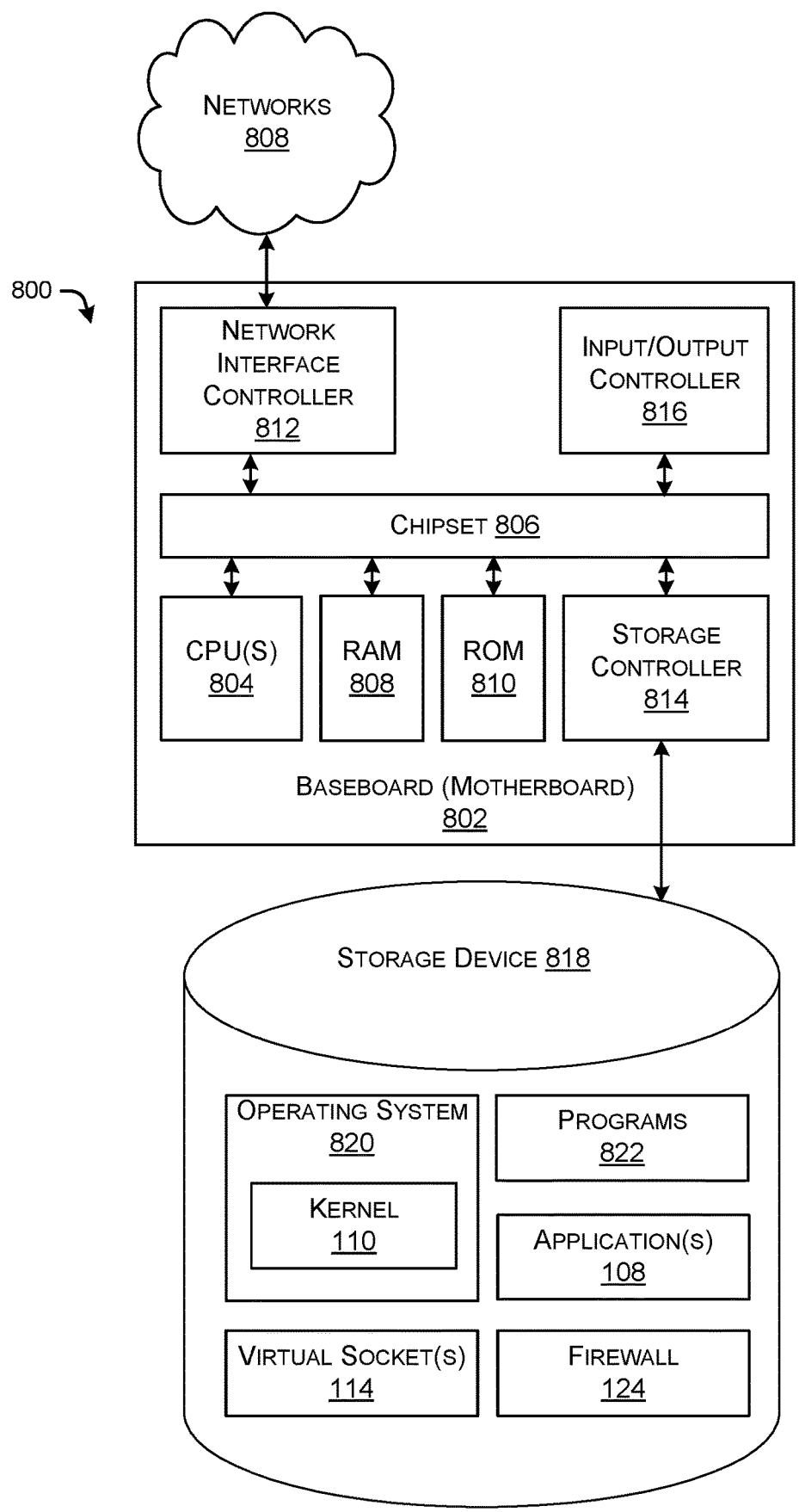
FIG. 8 shows an example computer architecture for a server computer capable of executing program components for implementing the functionality described above.

FIG. 8 shows an example computer architecture for a server computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a network node (e.g., the source 102, the destination 104, or any network device 107) described herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a random-access memory (RAM) 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 812. The chipset 806 can include functionality for providing network connectivity through a network interface controller (NIC) 814, such as a gigabit Ethernet adapter. The NIC 814 is capable of connecting the computer 800 to other computing devices over the network 812. It should be appreciated that multiple NICs 814 can be present in the computer 800, connecting the computer 800 to other types of networks and remote computer systems. In some instances, the NICs 814 may include at least on ingress port and/or at least one egress port.

The computer 800 can be connected to a storage device 818 that provides non-volatile storage for the computer. The storage device 818 can store an operating system 818, programs 820, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by any network node described herein may be supported by one or more devices similar to computer 800. Stated otherwise, some or all of the operations performed by a network node may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 818 utilized to control the operation of the computer 800. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX™ operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

As illustrated in FIG. 8, the storage device 818 stores an operating system 820, programs 822, which may include one or more processes, as well as the application(s) 108, the virtual socket(s) 114, and the firewall 124 described above. The operating system 820 may further include the kernel 110 descried above. The operating system 820, the programs 822, the application(s) 108, the virtual socket(s) 114, and the firewall 124 may include instructions that, when executed by the CPU(s) 804, cause the computer 800 and/or the CPU(s) 804 to perform one or more operations.

The computer 800 can also include one or more input/output controllers 828 for receiving and processing input from a number of input devices, such as a keyboard, a mouse, a touchpad, a touch screen, an electronic stylus, or other type of input device. Similarly, an input/output controller 828 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
receiving, at a virtual socket of a device, non-packetized data from an application;
generating, by the virtual socket of the device, a label based on the application;
generating, by the device, one or more data packets by packetizing the non-packetized data, wherein packetizing the non-packetized data comprises encapsulating the non-packetized data;
adding, by the device, a tag to the one or more data packets based on the label; and
transmitting, by the device, the one or more data packets to an external device.

2. The method of claim 1, wherein the virtual socket comprises a Berkeley Software Distribution (BSD) socket.

3. The method of claim 1, wherein the label comprises one or more bits of data identifying at least one of the application, the virtual socket, or a type of the non-packetized data.

4. The method of claim 1, the non-packetized data being first non-packetized data, the application being a first application, the label being a first label, the external device being a first external device, the method further comprising:
receiving, at the virtual socket of the device, second non-packetized data from a second application;
generating, by the virtual socket of the device, a second label based on the second application; and
dropping, by the device, the second non-packetized data based on the second label by:
refraining from packetizing the second non-packetized data; and
refraining from transmitting the second non-packetized data to a second external device.

5. The method of claim 1, wherein adding the tag to the one or more data packets based on the label comprises adding the tag to at least one header field of the one or more data packets.

6. The method of claim 1, wherein transmitting the one or more data packets comprises:
prioritizing, by the device, transmission of the one or more data packets over other data packets based on the label.

7. The method of claim 1, further comprising:
based on the label, analyzing, by a firewall of the device, the one or more data packets.

8. The method of claim 1, wherein packetizing the non-packetized data comprises:
based on the label, redundantly encoding the non-packetized data into the one or more data packets using an error correction code (ECC).

9. A system, comprising:
at least one processor; and
memory storing instructions that, when executed by the at least one processor, cause the at least one processor to perform operations comprising:
receiving, at a virtual socket, non-packetized data from an application;
generating, by the virtual socket, a label based on the application; and
generating one or more data packets by packetizing at least a portion of the non-packetized data, a header field of the one or more data packets comprising a tag based on the label.

10. The system of claim 9, wherein the virtual socket comprises a Berkeley Software Distribution (BSD) socket.

11. The system of claim 9, wherein the label comprises one or more bits of data identifying at least one of the application, the virtual socket, or a type of the non-packetized data.

12. The system of claim 9, the non-packetized data being first non-packetized data, the application being a first application, the label being a first label, the operations further comprising:
receiving, at the virtual socket, second non-packetized data from a second application;
generating, by the virtual socket, a second label based on the second application; and
dropping the second non-packetized data based on the second label.

13. The system of claim 9, wherein the operations further comprise:
adding a tag to the one or more data packets based on the label by adding the tag to at least one header field of the one or more data packets.

14. The system of claim 9, wherein adding the tag to the one or more data packets based on the label comprises adding the tag to at least one header field of the one or more data packets.

15. The system of claim 9, wherein the operations further comprise:
based on the label, analyzing, by a firewall, the one or more data packets.

16. The system of claim 9, wherein packetizing the non-packetized data comprises:
based on the label, redundantly encoding the non-packetized data into the one or more data packets using an error correction code (ECC).

17. A source, comprising:
at least one processor;
memory storing instructions that, when executed by the at least one processor, cause the at least one processor to perform operations comprising:
receiving, at a virtual socket, non-packetized data from an application;
generating, by the virtual socket, a label based on the application;
generating one or more first data packets by packetizing the non-packetized data, wherein packetizing the non-packetized data comprises encapsulating the non-packetized data;
adding a tag to the one or more first data packets based on the label;
determining, based on the label, that the one or more first data packets have a higher priority than one or more second data packets;
outputting the one or more first data packets to a first external device; and
in response to outputting the one or more first data packets to the external device, transmitting the one or more second data packets to a second external device.

18. The source of claim 17, the virtual socket being a first virtual socket, the non-packetized data being first non-packetized data, the application being a first application, the label being a first label, the operations further comprising:
receiving, at a second virtual socket, second non-packetized data from a second application;
generating, by the second virtual socket, a second label based on the second application;
generating the one or more second data packets by packetizing the second non-packetized data, wherein determining that the one or more first data packets have a higher priority than the one or more second data packets comprises:
comparing the first label to the second label.

19. The source of claim 17, further comprising:
a first port; and
a second port,
wherein the operations further comprise determining that the first port is less congested than the second port,
wherein outputting the one or more first data packets to the first external device comprises causing the first port to transmit the one or more first data packets to the first external device, and
wherein outputting the one or more second data packets to the second external device comprises causing the second port to transmit the one or more second data packets to the second external device.

20. The source of claim 17, wherein the operations further comprise:
based on the label, redundantly encoding the non-packetized data into the one or more data packets using an error correction code (ECC).

* * * * *